June 10, 1930.  H. BRACHTL  1,763,214
GROUNDING DEVICE
Filed May 29, 1926
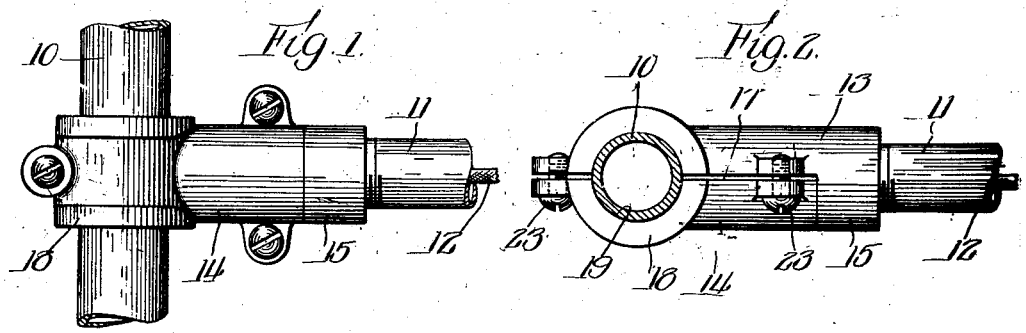
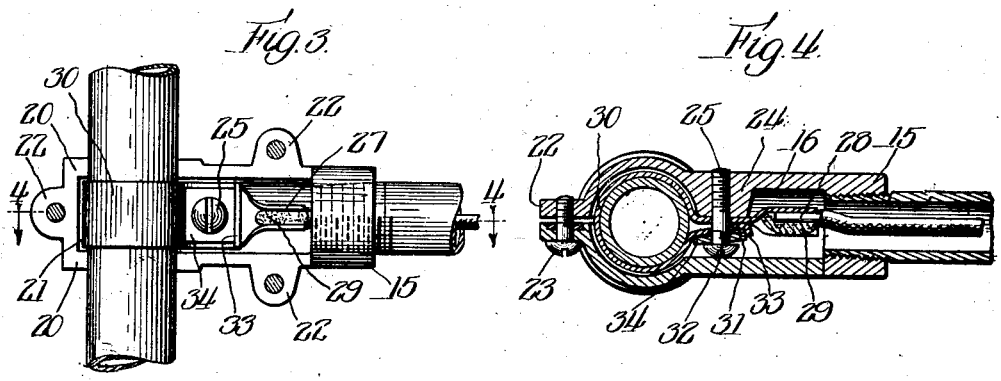
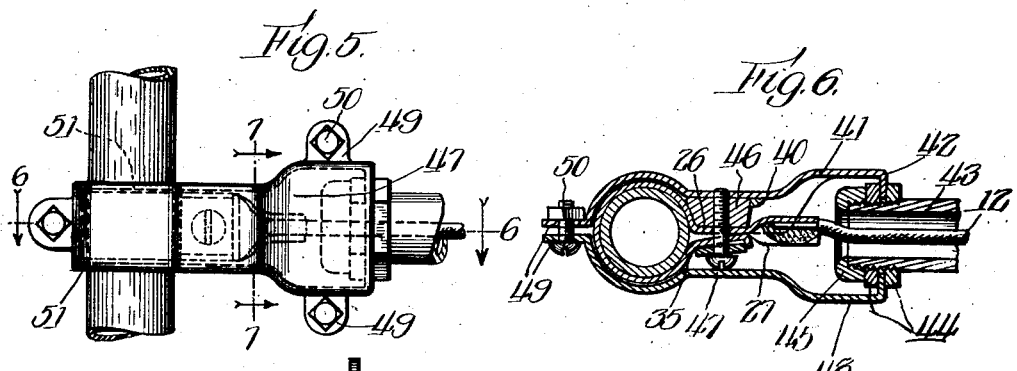
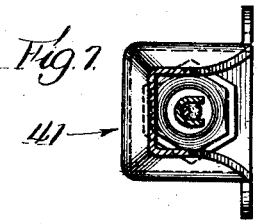
Inventor
Henry Brachtl, Patented June 10, 1930

1,763,214

UNITED STATES PATENT OFFICE

HENRY BRACHTL, OF CHICAGO, ILLINOIS, ASSIGNOR, BY MESNE ASSIGNMENTS, TO APPLETON ELECTRIC COMPANY, OF CHICAGO, ILLINOIS, A CORPORATION OF ILLINOIS

GROUNDING DEVICE

Application filed May 29, 1926. Serial No. 112,483.

This invention relates generally to grounding devices and in particular to a device for grounding a conduit and also a conductor in said conduit.

Modern house wiring systems usually have one line grounded. When the wiring is enclosed in a conduit or armored cable, it is desirable that the conduit and cable also be grounded.

The present invention aims to provide a single device for grounding the conduit system and the electrical wiring system to a suitable ground member, such as a water pipe; and to provide a grounding device for both systems which encloses the wire grounding clamp within a housing; which frees the wire grounding connection from all mechanical strain and provides a strong rigid mechanical connection between the conduit and the ground pipe; and which mechanically connects and electrically grounds both the electrical conductor and the conduit.

In the accompanying drawings there are shown two exemplary embodiments of the invention in which a wire conduit is grounded to a water pipe, the conduit having a single conductor therein and being clamped to the water pipe in one instance by a cast housing and in the other instance by a pressed sheet metal housing.

In the drawings Figure 1 is a side view of the closed grounding device.

Fig. 2 is an elevation of the device shown in Fig. 1.

Fig. 3 is a view of the device as seen in Fig. 1, but with the cover plate removed.

Fig. 4 is a cross section of the complete device, taken in the plane of the line 4—4 of Fig. 3.

Fig. 5 is a view similar to Fig. 1 showing a pressed steel housing.

Fig. 6 is a cross sectional view of Fig. 5 on the line 6—6 thereof.

Fig. 7 is a cross sectional view on the line 7—7 of Fig. 5 showing the enlarged end portion of the housing.

It is of course to be understood that the construction shown in the drawings and hereinafter more fully described is not to be construed as a limitation of the invention to the exemplary forms. Various other constructions and arrangements of the parts are contemplated as will appear from the character and scope of the appended claims.

In order to explain the principles of the invention, a suitable ground member is chosen as, for example, a water pipe 10. A conduit system to be grounded is represented by a branch portion thereof in the form of a conduit pipe 11. One of the conductors of the electrical system to be grounded is here represented by a single conductor or wire 12 in the branch line conduit 11.

One feature of the invention is the provision of a strong rigid mechanical connection between the conduit 11 and the pipe 10 apart from the grounding connection. This is here represented as a housing arranged rigidly to connect the two pipes 10 and 11, the housing comprising in the present instance a two-part casing having a body portion 13 to which the conduit pipe 11 is secured, and a cover portion 14. The parts 13 and 14 are complementary and fit together to form a clamp in the closed position of the housing, to be placed about the pipe 10, and also to form an enclosing housing for the electrical grounding means, such housing space preferably extending annularly about the ground pipe.

The present housing 13 (Fig. 2) comprises a casting which serves as a tubular extension of the conduit pipe 11. The casting provides a circular round threaded end 15 into which the pipe 11 is screwed. The casting is extended and is generally semi-circular in cross section, providing a recess as at 16 at one side of the diametral plane 17. The end of the housing body is enlarged as at 18 for the formation of the transverse pipe-receiving groove 19. Lateral ribs 20 are formed to define a channel 21 about the ground pipe. The cover 14 is complementary to the housing and likewise has ribs in continuation of the ribs 20 to complete an annular channel 21. Suitable lugs 22 are disposed about the housing parts for screws 23 which serve to close the housing and to clamp it to the water pipe.

Within the housing the conductor 12 is connected to a grounding means and the grounding means is connected to the ground pipe 10. A variety of structures may be employed for this purpose but preferably there is provided a grounding means which is both electrically and mechanically connected to the ground pipe and also to the housing. Within the housing there is a projection 24 into which enters a screw 25 from the inside of the housing. A copper grounding strap 26 lies flat on the projection 24 and has one end extending toward the conductor 12. The end of the strap may be bent to a trough shape as indicated at 27 so that the bare end 28 of the conductor 12 may be laid therein and secured electrically and mechanically by solder 29. The strap 26 extends in the other direction into the annular channel 21 about the water pipe as shown at 30, and its free end 31 is perforated at 32 to receive the screw 25. A retaining flange 33 may be formed at the extreme end of the strap for holding a square washer 34. Such a washer is preferably used for the purpose of keeping the strap close to the pipe in the vicinity designated 35 where it would otherwise be more or less tangentially stretched between the pipe 10 and the screw 25. It will of course be understood that the electrical connection of the ground strap 26 with the housing serves to ground the housing and this being electrically connected with the conduit also grounds the conduit.

In Figs. 5, 6 and 7 a modified form of housing is shown. This housing may be stamped from sheet metal rather than being cast as is the housing described in the first instance. The housing parts have generally the same relation and differ in but a few respects. The pressed housing comprises a body 40 with an enlarged end 41 flaring away from the grounded end as best shown in Fig. 7. The end face 42 is adapted by a suitable aperture to receive a conduit or cable 43 which is provided with suitable clamping structure preferably involving lock nuts 44 on each side of the end face wall. A bushing 45 may be placed inside the enlarged housing end on the end of the conduit, although this is not necessary where but one conductor is laid in the conduit as in the present instance, since grounding would not be objectionable. The grounding means duplicates that above described. block 46 may be used to provide a part corresponding to the projection 24.

The cover 47 is substantially like the cast cover with a portion 48 formed to close the enlarged and tapered body portion 41. Lugs 49 and stove bolts 50 are shown for securing the clamping housing together. In formation of the pressed steel housing the annular channel 21 about the water pipe is preferably maintained by the provision of flanges 51 on the housing.

It will thus be seen that the present invention provides a grounding device in which the electrical connection to the ground member is not depended upon to support the parts. The housing herein disclosed provides a strong rigid mechanical connection between the conduit and the ground pipe and therefore relieves the grounding strap herein described from all supporting strain. The formation of a closed housing prevents exposure of the parts and adds greatly to the finished appearance of the construction.

I claim as my invention:

1. A device for grounding a conductor and an enclosing conduit to a ground pipe comprising, in combination, two substantially semi-cylindrical complementary parts having semi-circular clamping jaws at one end to embrace a transversely extending ground pipe and forming a housing completely enclosing a portion of the ground pipe when in the clamping position, the clamping jaws of the parts being recessed to form an annular channel about the ground pipe, one of said parts having a tubular portion internally threaded for connection with the conduit, means for securing said parts together clamped to the ground pipe, a metal strap within said annular channel in the housing and surrounding the ground pipe and a screw device engaging the ends of said strap and one of said parts adjustable to clamp the strap to the ground pipe and to said part.

2. A device for grounding a conductor and surrounding conduit to a ground member comprising, in combination, a housing composed of two complementary parts having opposed transverse grooves forming an opening for receiving the ground member, means to clamp said parts together with the walls of said grooves in engagement with the ground member, one of said parts having a tubular portion for connecting the device to the end of a conduit, the other part providing a removable cover, a grounding strap enclosed by said housing provided with apertures at its opposite ends and having its intermediate portion looped to surround the ground member, and a screw device engaging the apertured ends of said strap and in threaded engagement with one of said parts operable to clamp the strap to the ground member and to said part, and means on one end of the strap to facilitate connecting the conductor thereto.

3. A device for grounding a conduit to a ground pipe comprising, in combination, a two part fitting having a transverse circular aperture therethrough for receiving the ground pipe, one of said parts having a portion internally threaded for connection to the end of a conduit, means for securing said parts together clamped to a ground pipe positioned in said aperture and a metal strap having a looped portion surrounding the ground pipe within said housing and a screw device for clamping the strap to the ground pipe and to one part of said housing.

4. A device of the character described, comprising a fitting having two complementary substantially semi-cylindrical sections, one end of one section being tubular in form and internally threaded to facilitate connection to a conduit, the other of said sections having one end abutting said tubular portion, the other ends of said sections having opposed semi-circular transverse grooves forming an opening to receive a ground pipe, means for securing said sections together clamped onto the ground pipe, a metallic strap encircling the ground pipe opening positioned intermediate the ends of said grooves so as to be completely enclosed by the fitting, and a screw threaded device for securing the ends of said strap to the section of the fitting which is threaded for attachment to the conduit.

5. A device for connecting a conductor and an enclosing conduit to a ground pipe comprising, in combination, a fitting formed in two sections one of which has a tubular portion at one end for receiving the end of a conduit, laterally spaced and opposed surfaces forming arcuate jaws at the other end of said fitting arranged to receive a ground pipe, means to clamp the ground pipe against said jaws comprising screw devices for securing the two parts of the fitting together, and a metallic strap looped to surround said ground pipe intermediate said laterally spaced surfaces and having apertures in the ends thereof and a screw device extending through the apertures in said strap and into threaded engagement with the fitting for clamping the strap onto the ground pipe and to the fitting.

6. A device of the character described comprising a hollow two part casing having a body portion and a cover portion complementary in character, said body portion being substantially semi-cylindrical in form and having a tubular portion at one end arranged to receive a conduit, and said cover portion being substantially semi-cylindrical in form and shorter than the body portion so as to abut the tubular end of the body portion, said parts having transverse and opposed semi-cylindrical grooves forming laterally spaced ground pipe receiving apertures, a flat metallic strap positioned intermediate said apertures and surrounding the ground pipe and having apertures in the opposite ends thereof, and a screw device entered through said apertures and into threaded engagement with said body portion for clamping the strap to the ground pipe and to the body portion of the casing.

7. A device for grounding a conductor and an enclosing conduit to a ground pipe comprising, in combination, two substantially semi-cylindrical complementary parts having semi-circular clamping jaws at one end to embrace a transversely extending ground pipe and forming a housing completely enclosing a portion of the ground pipe when in the clamping position, the clamping jaws of the parts being recessed to form an annular channel about the ground pipe, one of said parts having means arranged for rigid connection with the conduit so that the conduit communicates with said channel, means for securing the parts together in clamped relation on a ground pipe, a flexible metallic strap within said annular channel in the housing and adapted to surround the ground pipe, said strap being of a thickness slightly less than the depth of said channel whereby to permit firm clamping of the housing onto the ground pipe, and a screw device engaging the ends of said strap and one of said parts and adjustable to clamp the strap to the ground pipe and to said part.

In testimony whereof, I have hereunto affixed my signature.

HENRY BRACHTL.